3,134,759
TALL OIL AMIDE FOR INHIBITING CORROSION
Willard H. Kirkpatrick, Sugar Land, and Virgil L. Seale, Houston, Tex., assignors to Nalco Chemical Company, a corporation of Delaware
No Drawing. Filed Jan. 11, 1960, Ser. No. 1,441
5 Claims. (Cl. 260—97.5)

This invention relates to new and useful chemical compounds and to the method of preparation thereof.

This application is a continuation-in-part of copending application Serial No. 365,771, filed July 2, 1953 now abandoned.

One of the objects of the invention is to provide new chemical compounds which are especially useful for inhibiting corrosion of metal equipment in oil and gas wells.

Another object is to provide chemical compounds which are useful in inhibiting corrosion of pipe or equipment that is in contact with a corrosive oil-containing medium in oil wells, refineries, or the like.

Still a further object of the invention is to provide chemical compounds for inhibiting corrosion of metals in systems which are subject to contact by various corrosive agents, such as carbon dioxide, aqueous or non-aqueous solutions of carbon dioxide, hydrogen sulfide, aqueous or non-aqueous solutions of hydrogen sulfide, brines, weak inorganic acids and organic acids.

An additional object of the invention is to provide new and improved chemical compounds wihch are readily adsorbed by metal surfaces and act as corrosion inhibitors. Other objects will appear hereinafter.

In accordance with the invention, new and improved chemical compounds are provided which give new and improved results in inhibiting corrosion, particularly in inhibiting the corrosion of ferrous metals in oil and gas well equipment. These compounds can be described as compounds from the group consisting of organic polycarboxy acid amides and salts of an organic monocarboxy acid amide of an aliphatic polyamine containing at least two primary amino groups and at least one secondary amino group interconnected by carbon atoms in a linear chain, at least one of said primary and secondary amino groups being amidified by at least one carboxyl group of said organic monocarboxy acid and at least one of said primary and secondary amino groups being amidified or converted to a salt by one of the carboxy groups of said organic polycarboxy acid, said compound containing both free carboxy groups and free primary and/or secondary amino groups, the said organic monocarboxy acid containing at least eight carbon atoms, the said organic polycarboxy acid being a polymer fatty acid and containing in excess of 32 carbon atoms, with the further proviso that the molar ratio of the primary and secondary amino nitrogen of said polyamine to the carboxyl groups of said monocarboxylic acid reacted therewith is not greater than 5:1 and not less than 2:1 and the molar ratio of the remaining primary and secondary amino nitrogen of said polyamine to the carboxyl groups of said polycarboxy acid is not greater than 20:1 and not less than 2:1.

The initial polyamines which are preferably employed in preparing the corrosion inhibitors of the present invention include, for example, diethylenetriamine, triethylenetetramine, tetraethylenepentamine, dipropylenetriamine, tripropylenetetramine, and higher homologues thereof, including still residues that remain after the preparation of these materials. These starting materials can be described generally as polyalkylene polyamines because they contain two or more alkylene groups separated from each other by nitrogen atoms.

Another class of polyamines which can be employed as starting materials in making corrosion inhibiting compositions suitable for the practice of the invention are the hydroxy polyalkylene polyamines wherein one or more of the alkylene groups in a polyalkylene polyamine contains a hydroxyl group. Still another class of polyamines which may be employed for the practice of the invention are the hydroxy alkyl polyalkylene polyamines wherein one or more of the nitrogen atoms in the polyalkylene polyamine has attached thereto a hydroxy alkyl radical, for example, hydroxy ethyl diethylenetriamine, hydroxy ethyl dipropylenetriamine and homologues thereof.

The terminal amino groups of the polyamine are primary amino groups and the intermediate amino groups (or imino groups) are secondary. In an amidification reaction the acylation of the polyamine can take place either at the primary or secondary groups, but acylation preferentially occurs at the primary groups until these groups are acylated. When the primary amino groups are blocked by acyl groups, acylation or amidification occurs at the secondary amino groups.

The organic monocarboxy acids which are reacted with the aforesaid polyamines in order to produce corrosion inhibiting compositions for the practice of the invention include, for example, caprylic acid, prelargonic acid, capric acid, undecylic acid, lauric acid, tridecoic acid, myristic acid, pentadecanoic acid, palmitic acid, margaric acid, stearic acid, nondecylic acid, arachidic aid, behenic acid, carnaubic acid, hyenic acid, carboceric acid, cerotic acid, lacceroic acid, melissic acid, montanic acid, and psyllic acid. Undecenylenic acid, linoleic acid, linolenic acid, erucic acid, ricinoleic acid, and carbocylic monocarboxy acids of the terpene series, including, for example, abietic acid and related derivatives such as rosin, polymerized rosin, dehydrogenated rosin and cracked copals, naturally occurring fatty acids, resin acids and petroleum acids (e.g., naphthenic acids) can be employed as the source of the monocarboxy acid as well as synthetic acids made by the oxidation of petroleum. The fatty acids may be derived from natural or vegetable sources, for example, lard, cocoanut oil, palm oil, olive oil, corn oil, rapeseed oil, sesame oil, cottonseed oil, peanut oil, tallow, sardine and fish liver oils. The acids may be employed in the form of primary esters of the glycerides present in such oils.

In the preferred practice of the invention at least two different types of organic monocarboxy acids are employed in acylating the polyamine, one of said monocarboxy acids being a long chain aliphatic monocarboxy acid containing at least 8 carbon atoms and the other being a carbocyclic monocarboxy acid. One source of mixed acids of this type especially suitable for the preparation of corrosion inhibitors employed in the practice of the invention is tall oil.

The organic polycarboxy acids employed for the preparation of corrosion inhibiting compositions useful in the practice of the invention include, for example, dilinoleic acid, and other long chain polycarboxy polymer fatty acids or mixtures thereof containing an average of at least two carboxy groups per molecule and preferably containing at least 32 carbon atoms.

The preferred corrosion inhibiting compositions are prepared in two stages. In the first stage the polyamine is reacted with the organic monocarboxy acid or a mixture of such acids under conditions facilitating the elimination of water and the formation of an amide. The proportions of the organic monocarboxy acids employed should be at least sufficient to acylate one of the terminal primary amino nitrogen atoms of the polyamine and preferably sufficient to acylate both of the terminal primary amino nitrogen atoms of the polyamine. In the second stage the resultant monoamide or polyamide, as the case may be, is either converted to a salt of a polycarboxy acid or further amidified by a reaction with the organic polycarboxy acid. The amount of the organic polycarboxy acid should be such that one of the carboxy groups of the organic polycarboxy acid acylates a nitrogen atom of the polyamine. If both of the primary amino groups of the polyamine have been previously acylated by the organic monocarboxy acid, the further acylation with the polycarboxy acid will occur at the secondary amino group or groups. In general, the molar ratio of the polycarboxy acid to the unreacted primary and secondary amino nitrogen atoms of the intermediate amide is preferably not greater than 1:2.

To illustrate the practice of the invention a monobasic acid such as tall oil is reacted with a polyamine such as triethylene tetramine so that one carboxyl group reacts with at least one primary or secondary amino group leaving one or more unreacted basic primary or secondary amino groups. This is an intermediate product which is herein designated a basic amide intermediate.

This basic amide intermediate is then reacted with a relatively small proportion of an organic dicarboxy polymer fatty acid. The amide formation resulting from the reaction with a dicarboxy acid and a portion of the unreacted basic primary or secondary amino groups result in a finished product still containing a basic unreacted primary or secondary amino group. To secure an amide from the reaction of a dicarboxy acid it is necessary that the reaction be forced to a point that water is driven from the reaction mass. Most of the examples given hereinafter do not drive the reaction to amide formation but stop at salt formation. Both the amide and salt types of products are satisfactory so long as one of the carboxyl groups of the dicarboxy acid is unreacted. Although the process has been outlined above in a step-wise manner, the reactants can be reacted simultaneously to yield substantially the same type of finished product.

The resulting products, regardless of whether reacted simultaneously or step-wise or reacted to salt formation or amide formation with the polycarboxy acid, are amphoteric in nature having free carboxyl groups and free basic amino groups within the same molecule.

As previously indicated, in the formation of the basic amide intermediate, the ratio of nitrogen to the carboxyl group should be not greater than 5:1 and not less than 2:1. In reacting the basic amide intermediate with the polycarboxy acid, the ratio of unreacted primary or secondary amino group to the carboxyl group derived from the polycarboxy acid should be not greater than 20:1 and not less than 2:1.

As a further specific illustration, one mole of tall oil, calculated on the monocarboxy acids content therein, is reacted with one mole of diethylenetriamine to produce a basic amide intermediate. One mole of dilinoleic acid is then reacted with the basic amide intermediate, either under such conditions as to form a salt of the dilinoleic acid or an amide of the dilinoleic acid. Since each mole of the dilinoleic acid contains two carboxyl groups, one of the carboxyl groups will be left unreacted. Moreover, since the initial polyamine used as a starting material contains two primary amino groups and one secondary amino group, the resultant composition will contain unreacted basic amino groups as well as free carboxy groups. Inasmuch as the acylation of the primary amino groups proceeds preferentially it will be apparent that the unreacted amino groups in this case will be largely secondary amino groups. However, it is possible for a number of reactions to proceed simultaneously and the resultant composition can be considered to be a mixture of polyacylated polyamines containing basic amino groups as well as free carboxylic acid groups, the latter being a part of the polycarboxy acid employed in the reaction.

The temperatures required to produce polyacylated polyamines employed as corrosion inhibitors in accordance with the invention may vary depending upon the specific reactants but will usually be within the range of 150° C. to 300° C. in order to drive off chemically combined water and bring about amidification. Salt formation between the basic amide intermediate and the organic polycarboxy acid will take place at temperatures below those where chemically combined water is eliminated.

The invention will be further illustrated but is not limited by the following examples in which the quantities are stated in parts by weight unless otherwise indicated.

*Example I*

To a reaction vessel provided with agitation and a means for removal of an aqueous distillate and the return of an azeotrope to the reaction mass there was added approximately 5400 parts of crude tall oil, 2670 parts of a polyamine having a commercial designation polyamine H special and 2250 parts of a suitable hydrocarbon fraction such as $SO_2$ extract. The above reactants were heated with agitation until an aqueous distillate began to form. Since there was some contaminating water in the crude tall oil it was essential that the temperature was raised very gradually and slowly in order to prevent foaming and resulting loss of material from the reaction vessel. After the temperature reached approximately 150° C. to 160° C. most of the foaming problems had ceased and heating was continued at a customary rate until a total of about 375 parts of aqueous distillate had been secured, which required a maximum temperature of about 200° C. In no event will an amount of aqueous distillate be secured in excess of the contaminating water plus the theoretical amount of water resulting from amide formation. At this elevated temperature 435 parts of Emery dimer acids were added and reacted with the intermediate amide. The reaction mass was then permitted to cool to approximately 140° C. at which point 1300 parts of $SO_2$ extract were added and the mass further cooled to about 60° C. With agitation 220 parts of 99% isopropanol were added to yield the finished product.

In the preparation of ethylene amines commercially by treating ethylene dichloride with ammonia there is always obtained a mixture of the members of the polyalkylene polyamine series. At comparatively low temperatures and pressures ethylene diamine is formed predominantly in low yields. At higher temperatures and pressures the yields are greater and the proportion of polyethylene polyamines is higher. After the recovery of the pentamine and hexamine products there results a residue product consisting primarily of higher homologues. This residue is extremely viscous and in commercial handling is actually mixed with 25% of diethylene triamine to form the product polyamine H special.

Dimer acids are a commercial form of a dimeric polymer consisting essentially of dilinoleic acid. The method used in their preparation is set forth in the Journal of the Americal Oil Chemists' Society, 24, 65 (March 1947). Specifications are as follows:

| | |
|---|---|
| Neutral equivalent | 290–310. |
| Iodine value | 80–95. |
| Color | Gardner 12 max. |
| Dimer content | Approximately 85%. |
| Trimer and higher | Approximately 12%. |
| Monomer | Approximately 3%. |

*Example II*

In a suitable reaction vessel there is added 600 parts of a crude tall oil and 206 parts of diethylene triamine. The above materials are heated with agitation to secure a total of 36 parts of an aqueous-like distillate at a maximum temperature of 200° C. As soon as the intermediate amide has been formed 600 parts of dimer acid are introduced at the maximum temperature with agitation. After the reaction mass has cooled to approximately 140° C. 350 parts of a suitable hydrocarbon fraction such as $SO_2$ extract are added. After further cooling, 220 parts of 99% isopropanol are added to yield the finished product.

Example III

The procedure as described in Example II is followed with the exception that 206 parts of diethylenetriamine are replaced with 292 parts of triethylenetetramine.

Example IV

The procedure as described in Example II is followed with the exception that 206 parts of diethylenetriamine are replaced with 300 parts of polyamine H.

Example V

In a suitable reaction vessel there is introduced 300 parts of crude tall oil, 150 parts of polyamine H special and 25 parts of dimer acids. The mixture is agitated with heating until a total of 21 parts of aqueous distillate are secured. In a prior analysis it had been determined that there was contaminating water in the crude tall oil to account for 3 parts of the aqueous distillate secured in the above processing. The final aqueous distillate is secured at a temperature of 200° C. At this point 500 parts of Emery dimer acids are added and the reaction mass permitted to cool gradually to 80° C. Two hundred and twenty-five (225) parts of 99% isopropanol are added with stirring to yield the finished product.

Example VI

In a suitable reaction vessel there is added 150 parts of oleic acid, 150 parts of crude rosin acid, 150 parts of polyamine H special and 25 parts of dimer acids. The materials are heated together with agitation to remove 18 parts of aqueous distillate which begins to appear at 130° C. and reaches a maximum temperature of 200° C. After cooling to 60° C. 225 parts of methanol are added with agitation to yield the finished product.

Example VII

Following the procedure of Example II, 206 parts of diethylenetriamine are replaced with 262 parts of dipropylenetriamine.

Example VIII

Following the procedure of Example III, 292 parts of triethylenetetramine are replaced with 376 parts of tripropylenetetramine.

Example IX

Six hundred (600) parts of a refined grade of tall oil designated commercially as Facoil GN, 206 parts of diethylenetriamine and 100 parts of a suitable hydrocarbon fraction such as $SO_2$ extract are heated to remove 36 parts of an aqueous distillate at a maximum temperature of 220° C. The aqueous distillate begins to form at 160° C. At approximately 200° C. 600 parts of a polybasic fatty material designated in the trade as VR-1 acids are added with stirring and permitted to cool under atmospheric conditions. At a temperature of approximately 130° C. 300 parts of a suitable hydrocarbon fraction such as $SO_2$ extract are added with stirring to yield the finished product.

VR-1 acid is a mixture of polybasic acids, with an average molecular weight of about 1,000. It has an average of slightly more than two carboxylic acid groups per molecule. It is a by-product acid, and is a dark amber, rather viscous liquid. A typical sample of VR-1 acid gave the following analysis:

| | |
|---|---|
| Acid number | 150 |
| Iodine number | 36 |
| Saponification number | 172 |
| Unsaponifiable matter_____percent | 3.7, 3.5 |
| Moisture content_____do | 0.86 |

Tall oil is the liquid resin obtained in digesting wood to wood pulp in the paper industry. It is a dark brown, viscous liquid containing a crystalline sediment of abietic acid. From the results of several investigators the following principal constituents of tall oil are indicated: resin acids 30 to 45%, fatty acids 45 to 60%, unsaponifiable matter 6 to 12%. The unsaponifiable portion is a yellow viscous oil containing a waxy or pitchy material. The specifications of the particular grade of tall oil which is preferred for the present invention is as follows:

| | |
|---|---|
| Specific gravity (at 15.5° C.) | .9697 |
| Acid number | 164.0 |
| Saponification number | 173.6 |
| Ester number | 9.4 |
| Percent moisture | 0.0 |
| Percent rosin | 39.2 |
| Percent fatty acids (by difference) | 52.79 |
|     Percent linolenic acid_____ 19.25 | |
|     Percent linoleic acid_____ 10.5 | |
|     Percent oleic acid_____ 23.04 | |
| Percent unsaponifiable | 8.01 |
| Iodine number | 148.83 |
| Thiocyanogen, iodine number | 91.1 |
| Percent saturated fatty acids | None |
| Percent unsaturated fatty acids | 100 |
| Titer test_____° C | 5.5 |
| Pour test_____° C | 4.4 |
| Cloud test_____° C | 10–12.8 |

The quantity of the active effective corrosion inhibitor required to retard or prevent corrosion is very small, being of the order of a monomolecular film on the iron metal surface or other metal surface to be protected. In order to properly distribute the corrosion inhibitor on the metal surface it is preferably dispersed in an inert solvent such as $SO_2$ extract, isopropanol or mixtures thereof described in the examples, or in alcoholic or hydrocarbon liquids or homogeneous mixtures thereof. The active effective corosion inhibiting composition can also be prepared and used in the form of solids with or without weighting materials, wetting agents, dispersing agents, waxes and other auxiliary substances, including those substances sometimes used in the preparation of the so-called solid stick corrosion inhibitors.

The invention is especially useful in protecting metal equipment in oil and gas wells and the process is carried out simply by bringing the corrosion inhibiting composition in contact with the metal surface of the equipment. The preferred method is to add a corrosion inhibiting composition of the type described in the examples to the well annulus by means of a chemical proportioning pump continuously at the rate of one quart to two quarts of the aforesaid compositions per well per day. An alternative method is to inject a slug of the material into the well periodically over one or two days. Where the corrosion inhibiting composition is prepared as a solid it can be dropped into the well as a solid lump. Any of the other well known methods for applying corrosion inhibiting materials to oil and gas wells can be used in the practice of the invention.

The compositions of the invention are especially advantageous because they are compatible with petroleum products and have no adverse effect thereon. The amphoteric nature of the corrosion inhibiting compositions apparently results in better micelle formation and better adsorption at the metal surface. The chemical nature of the compositions, particularly the presence of the long chain polycarboxy acid groups in the molecule, assists in providng better adsorpton and larger coverage of the metal surface which is to be protected against corrosion inhibition.

In the parent application Serial No. 365,771 division was required between claims directed toward chemical compounds and claims reciting processes for preventing corrosion of metal. The processes for preventing corrosion of metal are claimed in a copending application Serial No. 609,517, filed September 13, 1956, which is a division of said parent application, and which matured into U.S. Patent 2,941,943 on June 21, 1960.

The invention is hereby claimed as follows:

1. A compound from the class consisting of organic polycarboxy acid amides and organic polycarboxy acid salts of an organic monocarboxy acid amide of an aliphatic polyalkylene polyamine containing at least two primary amino groups and at least one secondary amino group interconnected by two to three carbon atoms in a linear chain, at least one of said primary and secondary amino groups being amidified by a carboxyl group of said monocarboxy acid and at laest one of said primary and secondary amino groups being reacted to form a chemical group from the class consisting of amide and amine salt groups with one of the carboxyl groups of said organic polycarboxy acid, said compound containing at least one free carboxyl group from said polycarboxy acid and at least one basic amino group from the class consisting of primary and secondary amino groups from said polyamine, the said organic monocarboxy acid containing at least eight carbon atoms, the said organic polycarboxy acid being a polymer fatty acid and containing in excess of thirty-two carbon atoms, with the further proviso that the molar ratio of a part of the primary and secondary amino nitrogen of said polyamine to the carboxyl groups in said monocarboxy acid reacted therewith is not greater than 5:1 and not less than 2:1, and the molar ratio of the remaining primary and secondary amino nitrogen of said polyamine to the carboxyl groups of said polycarboxy acid is not greater than 20:1 and not less than 2:1.

2. An organic polycarboxy acid salt of a tall oil amide of an aliphatic polyethylene polyamine containing two terminal primary amino groups and at least one secondary amino group interconnected by ethylene groups in a linear chain, the said compound containing both free carboxyl groups and basic amino groups from the class consisting of primary and secondary amino groups, the said organic polycarboxy acid consisting essentially of an aliphatic dicarboxy polymer fatty acid containing in excess of thirty-two carbon atoms, with the further proviso that the molar ratio of a part of the primary and secondary amino nitrogen of said polyamine to the carboxyl groups in said tall oil is not greater than 5:1 and not less than 2:1, and the molar ratio of the remaining primary and secondary amino nitrogen of said polyamine to the carboxyl groups of said organic polycarboxy acid is not greater than 20:1 and not less than 2:1.

3. An organic polycarboxy acid amide of a tall oil amide of an aliphatic polyethylene polyamine containing two terminal primary amino groups and at least one seconday amino group interconnected by ethylene groups in a linear chain, said compound containing both free carboxyl groups and basic amino groups from the class consisting of primary and secondary amino groups, the said organic polycarboxy polymer fatty acid being essentially an aliphatic dicarboxy acid containing an excess of thirty-two carbon atoms, with the further proviso that the molar ratio of a part of the primary and secondary amino nitrogen of said polyamine to the carboxyl groups in said tall oil is not greater than 5:1 and not less than 2:1, and the molar ratio of the remaining primary and secondary amino nitrogen of said polyamine to the carboxyl groups of said polycarboxy acid is not greater than 20:1 and not less than 2:1.

4. An organic polycarboxy acid salt of a tall oil amide of an aliphatic polyethylene polyamine containing two primary amino groups and at least one secondary amino group interconnected by ethylene groups in a linear chain, said compound containing both free carboxyl groups and basic amino groups from the class consisting of primary and secondary amino groups, the said organic polycarboxy acid consisting essentially of dilinoleic acid, with the further proviso that the molar ratio of a part of the primary and secondary amino nitrogen of said polyamine to the carboxyl groups in said tall oil is not greater than 5:1 and not less than 2:1, and the molar ratio of the remaining primary and secondary amino nitrogen of said polyamine to the carboxyl groups of said polycarboxy acid is not greater than 20:1 and not less than 2:1.

5. An organic polycarboxy acid salt of a tall oil amide of an aliphatic polyethylene polyamine containing two primary amino groups and at least one secondary amino group interconnected by ethylene groups in a linear chain, said compound containing both free carboxyl groups and basic amino groups from the class consisting of primary and secondary amino groups, the said organic polycarboxy acid consisting essentially of polycarboxy polymer fatty acids having an average molecular weight of about 1000 and an average of slightly more than two carboxyl groups per molecule, with the further proviso that the molar ratio of a part of the primary and secondary amino nitrogen of said polyamine to the carboxyl groups in said tall oil is not greater than 5:1 and not less than 2:1, and the molar ratio of the remaining primary and secondary amino nitrogen of said polyamine to the carboxyl groups of said polycarboxy acid is not greater than 20:1 and not less than 2:1.

References Cited in the file of this patent

UNITED STATES PATENTS

| | | |
|---|---|---|
| 2,201,041 | Katz | May 14, 1940 |
| 2,482,761 | Goebel | Sept. 27, 1949 |
| 2,830,021 | Smith et al. | Apr. 8, 1958 |